| United States Patent [19] | [11] Patent Number: 4,772,476 |
| Kealy et al. | [45] Date of Patent: Sep. 20, 1988 |

[54] METHOD FOR REDUCING THE SEVERITY OF HIP JOINT LAXITY IN DOGS

[75] Inventors: Richard D. Kealy, Waterloo; Dennis F. Lawler, O'Fallon, both of Ill.

[73] Assignee: Ralston Purina Company, St. Louis, Mo.

[21] Appl. No.: 77,949

[22] Filed: Jul. 27, 1987

Related U.S. Application Data

[63] Continuation of Ser. No. 838,870, Mar. 12, 1986, abandoned.

[51] Int. Cl.$^4$ ............................................... A23K 1/00
[52] U.S. Cl. ........................................ 426/2; 426/74; 426/623; 426/630; 426/805
[58] Field of Search ..................... 426/2, 74, 623, 630, 426/805; 424/128, 153

[56] References Cited

U.S. PATENT DOCUMENTS

| | | | |
|---|---|---|---|
| 4,107,346 | 8/1978 | Kravitz | 426/74 |
| 4,322,407 | 3/1982 | Ko | 424/128 |
| 4,499,078 | 2/1985 | Reviei | 424/153 |
| 4,540,577 | 9/1985 | Hunt et al. | 426/2 |

OTHER PUBLICATIONS

Resnick "Effect of an All Meat Diet & a High Energy Carbohydrate Diet on Hip Formation in Dogs" Veterinary Medicine Jun. 1974 pp. 739–743.
Lust et al "Development of Hip Dysplasia in Dogs" Am. J. Vet. Res. vol. 34 Jan. 1973 pp. 87–91.
Lust et al. "Canine Hip Dysplasia: Concepts & Diagnosis JAVMA Sep. 1985 pp. 1–11.
Mongin et al. "Dietary Balance & Unbalance Between Na, K & Cl" Proceedings of the 2nd European Symposium on Poultry Nutrition Section C Oct. 8–11 (1979) pp. 60–63.
Veterinary Medicine/Small Animal Clinician (Oct., 1976) pp. 1399–1403 "Chronic Subclinical Scurvy and Canine Hip Dysplasia".
Veterinary Medicine/Small Animal Clinician (Jun., 1974) p. 739 "Effect of an All Meat Diet and a High Carbohydrate Diet on Hip Formation in Dogs".
Feedstuffs (Apr. 30, 1979) "Dietary Electrolytes—Story with Mary Facets".
J. World Poultry Science 14 (1968) p. 204, Mongin P.—"The Effect of Dietary Electrolyte Balance on Poultry".
Proc 3rd Annual Int. Minerals Conf. (Jan. 16, 1980) Mongin P.—"The Effect of Acid Base Balance on Poultry."
Growth and Poultry Meat Production (1977) pp. 235–247—A General Synopsis Concerning the Interrelationship Between Acid Base Balance and Cartilage Abnormalities in Poultry.
R. M. Leach (undated)—"Sodium, Potassium and Chloride: Requirements and Interrelationships".
Vol. 13 (Sep./Oct., 1977)—"Hip Dysplasia in Beagles Fed Protein and Carbohydrate Diets", pp. 595–598, pp. 267, 269.
JAVMA (Sep., 1985)—"Canine Hip Dysplasia: Concepts and Diagnosis: by George Lust et al.
Am J. Vet. Res.; vol. 41; pp. 55–60 (Jan., 1980) by G. Lust et al.—"A Relationship Between Degree of Laxity and Synovial Fluid Volume in Coxofemoral Joints of Dogs Predisposed for Hip Dysplasia".
Am. J. Vet. Res.; vol. 34; pp. 87–91 (1973) by George Lust et al.—A General Discussion of the Development of Hip Dysplasia in Dogs.
Hakan Kasstrom (undated) "Nutrition, Weight Gain, and Development of Hip Dysplasia" pp. 135–179.

*Primary Examiner*—R. B. Penland
*Attorney, Agent, or Firm*—Virgil B. Hill

[57] ABSTRACT

A method for reducing the severity of hip dysplasia in animals is provided wherein the animals are fed a nutritionally balanced composition during the formative stage of growth when the animal is particularly vulnerable to hip dysplasia, in which the dietary electrolyte balance in the composition is controlled to a level that is not greater than about 20 milliequivalents/100 g. Electrolyte balance is determined according to a formula wherein:

Dietary Electrolyte Balance (Meq/100 g)=Sodium (Meq/100 g)+Potassium (Meq/100 g)−Chloride (Meq/100 g).

4 Claims, No Drawings

METHOD FOR REDUCING THE SEVERITY OF HIP JOINT LAXITY IN DOGS

This is a continuation of application Ser. No. 838,870, filed Mar. 12, 1986, now abandoned.

BACKGROUND OF THE INVENTION

The present invention relates to a method of reducing the severity hip dysplasia in animals, and including a dog food composition which has been found to be highly effective for this purpose.

Canine hip dysplasia is a coxofemoral joint deformity which is a common problem in veterinary medicine. The disease affects many types of dogs but is particularly pronounced with breeds of dogs which are large in size, such as dogs that weigh more than 35 pounds. Generally, larger the size of the particular breed of dog involved, the higher the incidence of hip dysplasia. Canine hip dysplasia is a disease that occurs in young animals, such as puppies, and affects the dog for its entire lifespan.

Hip dysplasia in the dog has also been recognized as a hereditary disease that is characterized by laxity of the hip joints and a degeneration of tissues in the joint. Laxity of the hip joint begins a cycle, in which movement by the animal and force applied to the joint forces the femoral head into an abnormal position. The abnormal positioning of the femoral head results in erosion of the joint cartilage, fibrillation of the round ligament and inflammatory changes in the synovial membrane. The end result of joint laxity is an abnormally shallow acetabulum and a flattened femoral head.

Clinically, the disease is highly variable in dogs ranging from minimal clinical signs in some dogs to symptoms of a crippling disease in others. In addition, the severity of the clinical signs does not necessarily correlate with radiographic measurement or pathologic severity of the condition itself. Differences in breeds of dogs, as well as individual temperament of the dogs, can also affect the clinical signs of the disease.

For the most part, diagnosis of hip dysplasia is made by a standardized radiographic examination, which has been found to be more than 70% accurate, with an even higher degree of accuracy when the dogs age is closer to 2 years.

It has been recognized that most cases of canine hip dysplasia develop within the first two years of life. While long term breeding programs might reduce the severity of hip dysplasia in certain breeds of dogs, it is equally apparent that environmental factors during the first two years of growth may also be a contributing cause.

The exact nature of the environmental factors that might influence the severity or occurrence of hip dysplasia in dogs at the present time is not entirely known. There are a number of factors which have been considered. One of these factors is the influence of hormonal balance on the development of joint laxity. At the present time, endogenous hormone balance has not proven to be significantly involved in hip dysplasia with dogs. Studies have also been conducted in which the dogs were confined during part of the growth cycle in order to result in a lower occurrence of hip dysplasia, but this has also given conflicting results. Rapid weight gain has also been investigated and had been thought to be prominently associated with occurrence of canine hip dysplasia, but to date has not proven to be a primary cause.

The influence of the diet on the occurrence of canine hip dysplasia during the first year of growth has also been evaluated by various investigators. It has been reported for example, that hip dysplasia was accelerated by feeding a high carbohydrate diet and was ameliorated by feeding a high meat or all meat diet. The oral administration of ascorbic acid and its effect on canine hip dysplasia has also been investigated and it was determined that this did not significantly affect the incidence of canine hip dysplasia in dogs.

It is therefore an object of the present invention to provide a method for reducing the severity of hip dysplasia in animals such as dogs, by administering a diet which has found to be effective for this purpose.

It is another object of the present invention to provide a method of reducing the severity of hip dysplasia in dogs by the control of various nutritional factors in the diet of the animal during the early stages of life.

It is a further object of the present invention to provide a nutritionally balanced dog food composition which has been found to substantially reduce the severity of hip dysplasia in dogs.

It is a still further object to provide a nutritionally balanced dog food composition which may be fed to the animals during the first years of growth and result in less severity of hip dysplasia as the dog matures.

SUMMARY OF THE INVENTION

A method of reducing the severity of hip dysplasia in animals is disclosed comprising; forming a nutritionally balanced food composition having a dietary electrolyte balance which is not greater than 20 milliequivalents/100 g of the food composition. The dietary electrolyte balance is intended to refer to the combination of sodium, potassium, and chloride ions administered in the diet. The electrolyte balance for the nutritionally balanced food composition of the present invention is determined according to the following formula wherein;

Dietary electrolyte balance (milliequivalents/100 g) = Sodium (milliequivalents/100 g) + Potassium (milliequivalents/100 g) − Chloride (milliequivalents/100 g).

It has been found that the administration of a nutritionally balanced food composition having the noted level of dietary electrolyte balance, reduces the severity of hip joint laxity in dogs when the composition is administered during the first years of life to dogs which normally have a high incidence of hip dysplasia. While the present invention is not intended to be limited by any theory of operation, nevertheless it is believed that controlling the dietary electrolyte balance may also control the formation of hip joint synovial fluid, thereby minimizing joint laxity during this critical stage of growth. The control of dietary electrolytes in a nutritionally balanced diet provides a means of reducing the severity of canine hip joint laxity in animals fed a diet in which a dietary electrolyte balance is provided at a level of not greater than about 20 milliequivalents/100 g, wherein the dietary electrolyte balance is calculated pursuant to the above identified formula.

DESCRIPTION OF THE PREFERRED EMBODIMENTS

The method of reducing the severity of hip dysplasia in dogs pursuant to the present invention is provided by feeding the dogs during the formative months of growth a dog food composition which comprises a nutritionally balanced mixture of proteinaceous and farinaceous ingredients, generally having a moisture content of less than about 75% by weight. Therefore, the present invention is generally intended to apply to canned, dry or intermediate moisture pet food products as those terms are recognized by those skilled in the art of pet food formulation and manufacturing.

The dog food composition of the present invention, in which the dietary electrolyte balance is controlled for purposes of reducing the severity of hip dysplasia is not intended to be restricted by any specific listing of ingredients since these will be entirely dependent upon the nutritional balance of the ration desired as well as their availability to the pet food manufacturer. Generally, aside from the nutritional balancing ingredients such as vitamins, minerals or other additives such as preservatives, emulsifiers and the like, dog food compositions for the most part consist of ingredients that may either be termed as substantially proteinaceous ingredients or substantially farinaceous ingredients. Although the specific protein levels should not be considered limiting for purposes of the present invention a proteinaceous ingredients may be defined as any material having a protein content of at least about 15% by weight whereas the farinaceous material may be defined as that material having a protein content below about 15% by weight with and containing a major fraction of starchy or carbohydrate containing materials.

Examples of proteinaceous materials that are typically used in commercial pet foods such as dog foods are vegetable protein meals such as soybean, cotton seed and peanut; animal protein such as casein, albumen and meat tissue including fresh meat; as well as rendered or dried "meals" such as fish meal, poultry meal, meat meal, bone meal and other materials of this type. Other types of proteinaceous materials include microbial proteins such a yeast and other types of protein such as wheat gluten or corn gluten.

Examples of typical farinaceous materials employed in commercial pet foods such as dog foods are grains such as corn, milo, alfalfa, wheat, soy hulls and various other grains that are relatively low in protein content. Numerous other materials may also be added to the dog food composition which do not necessarily fall into either the proteinaceous or farinaceous category such as dried whey and other diary by-products or carbohydrates. The present invention as noted is not intended to be limited by any specific listing of ingredients since these are generally determined by the animal to which it is being fed as well as the availability of certain types of grains or other materials to the pet food manufacturer.

For purposes of a complete understanding of the present invention it should be recognized that the term "dog food composition" or "dog food material" is generally intended to apply only to commercially sold, and nutritionally balanced dog food compositions. Dog food compositions meeting this definition may therefore be characterized by a minimal protein content since there is a certain minimal protein level required when the dog food compositions provides the sole food intake for the animal. Commercially available, dry, dog food compositions typically hae a minimum protein content that is dependent upon the age of the animal to which it is to be fed or if the animal is mature whether or not it is involved in breeding. Thus, females involved in breeding or puppies would require a minimum protein content of at least about 20% by weight and preferably about 20-25% by weight on a 90% dry matter basis. Dogs not in either of the above categories would require a minimal protein level of at least about 12% by weight based upon a 90% dry matter basis in the dog food composition. These figures are based on the assumption that the dog food composition provides the sole food intake for the dogs and therefore commercial dog food compositions typically contain a minimum protein level of at least about 15% by weight on a 90% dry matter basis in the composition in order to meet the minimum protein requirements of any type of dog.

A critical factor insofar as the present invention is the dietary electrolyte balance in the nutritionally balanced dog food composition. It has been determined for example that if the dietary electrolyte balance of the dog food composition is maintained at a level that is not greater than about 20 milliequivalents/100 g of the dog food composition, a reduction in the severity of hip joint laxity in dogs to which the composition is fed is obtained. The dietary electrolyte balance of the composition of the present invention is determined according to the following formula:

Dietary electrolyte balance (milliequivalents/100 g)=Sodium (milliequivalents/100 g)+Potassium (milliequivalents/100 g)—Chloride (milliequivalents/100 g).

It is the control of these three ions in the nutritionally balanced dog food composition that has been found to provide a remarkable reduction in the severity of hip joint laxity in dogs to which the diet is fed. The exact means or manner in which these ions are controlled in the diet is not critical to the practice of the present invention and the level of these three ions in the diet can be controlled primarily by selection of the ingredient based upon analysis or estimated content of these three ions in any of the ingredients used in formulation of the dog food composition.

It is preferred that dietary electrolyte balance for the dog food composition pursuant to the present invention, be maintained at a level that is not greater than about 20 milliequivalents/100 g and preferably between about zero and 20 milliequivalents/100 g, most preferably at a level of about 10 milliequivalents/100 g or less. If the dietary electrolyte balance is maintained at these levels, it has been found that the feeding of this diet to dogs having hip joint laxity during the formative years of growth results in less severity of this condition as the dogs mature.

The dietary electrolyte balance is believed to directly influence a reduced degree of hip joint laxity during a formative period of growth, thereby providing a means of reducing the degree of laxity in the hip joint and consequently a reduction in the severity of hip dysplasia. The following examples are intended to describe specific but non limiting embodiments of the present invention.

EXAMPLE 1

Studies were conducted on joint laxity in a number of breeds of dogs known to be prone to canine hip dysplasia and fed the different dog food compositions described in the following examples.

A scoring system known as the Norberg score was used to measure the degree of hip joint laxity in the animals. The Norberg hip angle measurement involves the use of a protractor like device to estimate the closeness of fit of the femoral head (ball) and the acetabulum (socket) of the hip on a radiograph. Conventional pelvic radiographic examination of the animals was used to determine the conformation of hip joints. Radiographs were taken with dogs under general anesthesia. Radiographs of the dogs were evaluated with the Norberg score at 30 weeks of age or thereafter.

On each radiograph, a line was drawn between the center of the femoral heads of each hip and another line was drawn between the center of each femoral head and the cranial rim of its respective acetabulum. The angle formed between these lines was first used by Norberg and is described in Douglas, S. W., Williamson H. D.; *Veterinary Radiological Interpretation,* Philadelphia, Lea and Febiger 1970 pp. 109–111. This angle is referred to as the Norberg score in the following data. The error in measuring radiographs due to positions of the animal was found to be minimal. In the case of the Norberg "score", the higher number indicates superior hip joint fit. Any Norberg score of less than 105° indicates that some hip dysplasia is present. Measurements in the series of tests set out below revealed a Norberg score that ranged from 50° to 112.5°. Most of the dogs involved in the study exhibited some degree of hip dysplasia. The Norberg score was evaluated on the left hip, right hip, both hips (average score) and the worst hip for all dogs.

Each of the dog food rations or diets having the formulas set forth in the following examples was transferred to a steam conditioner and subjected to steam and moisture in order to adjust the moisture content to between about 20 and 40% by weight. The conditioned mixture was then extruded under conditions of elevated temperature and pressure to form a continuous strand of expanded product that was segmented into discrete particles or pieces by a rotating cutting knife upon exit of the strand from the extruder. The particles were then conveyed to a forced air drying system and the moisture level reduced to below about 10% by weight. The dried, extruded dog food particles after exit from the forced air oven and prior to cooling were transported from the dryer to a spray chamber by a bulk conveyor. The particles were dropped from the conveyor belt in a sheet and fell through the spray chamber. Spray heads located on both sides of the falling sheet sprayed a solution of the indicated amount of animal fat on the hot particles as they fell through the spray chamber.

The above identified mixture was heated to a temperature of about 140° F. to facilitate spraying on the hot particles of the dog food composition in the spray chamber. The spray coated dog food particles were collected at the bottom of the spray chamber and transported to a tumbling drum. The tumbling drum was maintained at a temperature above the melting point of the fat and the particles were tumbled until they has a substantially uniform coating of the fat on the surfaces thereof. The coated food particles were then removed from the drum and cooled to ambient temperature. The resultant dried dog food composition had a moisture content of less than about 12% by weight, and a protein content above about 15% by weight on a 90% dry matter basis.

18 pointer pups were divided into three groups according to sex, litter and body weight. The pups were fed three diets identified as Rations 1–3 which each had the dietary electrolyte balance listed in Table 2 below. The specific formulas for rations 1–3 are set forth in Table 1 below. Pups were fed the specific diets from 6 weeks until 30 weeks of age. Norberg scores were taken at 30 weeks of age and are listed in Table 3.

TABLE 1

| Formulas of Rations 1–3 (% by Weight) | | | |
|---|---|---|---|
| Ingredient | Ration 1 | Ration 2 | Ration 3 |
| Corn | 53.76 | 53.75 | 53.83 |
| Corn Gluten Meal (60% protein) | 12.43 | 12.43 | 12.43 |
| Soybean Meal (49% protein) | 7.83 | 7.83 | 7.83 |
| Salt | 1.00 | 0.80 | — |
| Sodium Bicarbonate | — | 0.30 | 1.45 |
| Trace Minerals | .20 | .20 | .20 |
| Potassium Bicarbonate | — | 1.00 | 1.00 |
| Calcium Carbonate | 1.29 | 1.29 | 1.29 |
| Dicalcium Phosphate | 2.58 | 2.58 | 2.58 |
| Vitamin premix | 0.54 | 0.54 | 0.54 |
| Sucrose | 1.68 | 0.76 | 0.39 |
| Soy Protein Isolate | 10.01 | 10.01 | 9.85 |
| Rice Hulls | 3.50 | 3.50 | 3.60 |
| Conc. Hydrochloric Acid | .17 | — | — |
| Fat | 5.00 | 5.00 | 5.00 |
| Vitamine A&E oil | .01 | .01 | .01 |

TABLE 2

| Laboratory Analyses for Rations 1–3 | | | |
|---|---|---|---|
| Ingredient | Ration 1 | Ration 2 | Ration 3 |
| Moisture (%) | 7.5 | 7.2 | 8.4 |
| Protein (%) | 25.8 | 26.1 | 26.0 |
| Fat, (Acid Hydrolysis) | 8.6 | 9.4 | 9.5 |
| Calcium (%) | 1.2 | 1.18 | 1.17 |
| Phosphorus (%) | 1.0 | .92 | .96 |
| Sodium (%) | .43 | .44 | .45 |
| Potassium (%) | .39 | .77 | .75 |
| Chloride (%) | .68 | .52 | .06 |
| pH (units) | 5.0 | 6.2 | 7.4 |
| Lysine (%) | 1.19 | 1.19 | 1.17 |
| Methionine (%) | .38 | .37 | .38 |
| Na + K—Cl (Meq/100 g)* | 10 | 24 | 37 |

*Dietary Electrolyte Balance

TABLE 3

| Effect Of The Diet On Hip Joint Laxity | | | |
|---|---|---|---|
|  | Ration 1 | Ration 2 | Ration 3 |
| Number of Pups | 6 | 6 | 6 |
| Weight Gain* (lb) | | | |
| 16 wk (avg) | 18.9 | 17.8 | 12.9 |
| 30 wk (avg) | 43.1 | 40.8 | 32.3 |
| Length Gain* (in) | | | |
| 16 wk (avg) | 11.7 | 11.1 | 9.3 |
| 30 wk (avg) | 18.3 | 18.3 | 16.2 |
| Norberg score | | | |
| Left Hip | 96.2 | 94.7 | 93.0 |
| Right Hip | 106.5 | 98.2 | 96.5 |
| Average | 101.3 | 96.4 | 94.7 |
| Worst Hip | 96.1 | 93.3 | 92.0 |

*Weight and length gains on a 50/50 sex basis.

An examination of the Norberg scores in Table 3 clearly shows a lesser severity of hip dysplasia occurred with animals fed the composition which has a dietary electrolyte balance of 10.

EXAMPLE 2

30 St. Bernard pups, approximately 8 months of age were allotted to treatment with Rations 1–3 having the formulas in Table 1 and produced according to Example 1, according to sex and Norberg scores taken on the animals at 30 weeks of age as described in Example 1. The previous Norberg scores were used to randomize pups for the test. Table 4 lists the laboratory analyses for Rations 1-3, including the dietary electrolyte balances. The pups were fed the diets until the pups were 10 months old, at which time Norberg scores were taken as described in Example 1. The change in Norberg scores from the original measurement are set forth in Table 5 below.

TABLE 4

Laboratory Analyses For Diets 4-6

|  | Diet 4 | Diet 5 | Diet 6 |
|---|---|---|---|
| Sodium (%) | .40 | .44 | .45 |
| Potassium (%) | .30 | .71 | .69 |
| Chloride (%) | .65 | .53 | .00 |
| Protein (%) | 24.9 | 24.2 | 24.5 |
| Fat, A.H. (%) | 10.3 | 9.5 | 9.9 |
| Methionine (%) | .40 | .37 | .37 |
| Lysine (%) | 1.17 | 1.14 | 1.12 |
| Calcium (%) | 1.42 | .99 | .94 |
| Phosphorus (%) | .95 | .89 | .80 |
| Magnesium | .11 | .11 | .10 |
| pH | 5.0 | 6.3 | 7.9 |
| Na + K—Cl (Meq/100 g)* | 7.0 | 22.0 | 37.0 |

*Dietary Electrolyte Balance

TABLE 5

Effect Of The Diets On Hip Joint laxity

|  | Diet 4 | Diet 5 | Diet 6 | Statistical Significance |
|---|---|---|---|---|
| Number of Pups | 9 | 10 | 10 | |
| Weight Gain* (lb) | 10 | 10.1 | 7.4 | |
| Norberg Score Change | | | | |
| Left Hip | −2.8 | −3.9 | −2.4 | N.S. |
| Right Hip | .8 | −2.7 | −7.1 | P < .05 |
| Average | −1.0 | −3.3 | −4.7 | N.S. |
| Worst Hip | −3.5 | −6.8 | −8.8 | N.S. |

*Average weight gain on a 50/50 sex basis.

An examination of the change which occurred with the Norberg scores clearly indicates that the drop in Norberg scores was the least with the diet which has a dietary electrolyte balance of 7. The low level of change in Norberg scores includes lesser severity of hip joint laxity since the lower the Norberg score, the more pronounced is the hip joint laxity.

EXAMPLE 3

33 St. Bernard pups, approximately 6 weeks of age were allotted to treatment with diets 7-9, according to sex and litter. The specific formulas for diets 7 and 8 are set forth in Table 6 below and these were produced as described in Example 1. Diet 9 was a commercially available dry dog food product sold under the trade name "Cycle 1" by General Foods Corporation, White Plains, NY. Table 7 lists the laboratory analyses for diets 7-9, including the dietary electrolyte balances. The pups were fed the diets until the pups were 30 weeks of age, at which time Norberg scores were taken as described in Example 1. The Norberg scores are set forth in Table 8 below.

TABLE 6

Formulas For Diets 7-8 (% by weight)

| Ingredients | Diet 7 | Diet 8 |
|---|---|---|
| Corn | 39.49 | — |
| Wheat | — | 64.27 |
| Corn Gluten Meal (60% protein) | 8.64 | 8.70 |
| Soybean Meal (49% protein) | 18.8 | 6.50 |
| Calcium Chloride | — | .25 |
| Fish Meal | — | 5.00 |
| Meat & Bone Meal | 8.80 | 5.50 |
| Salt | .74 | .50 |
| Mineral Mixture | .20 | .20 |
| Whey | 1.47 | 3.07 |
| Choline Chloride | — | .27 |
| Lysine | .16 | .18 |
| Vitamin Premix | .55 | .55 |
| Fat | 5.49 | 5.00 |
| Vitamin A&E Oil | .01 | .01 |
| Defluorinated Phosphate | .55 | — |
| Rice Hulls | 4.5 | — |
| Corn Gluten Feed | 10.6 | — |

TABLE 7

Analyses For Diets 7-9

|  | Diet 7 | Diet 8 | Diet 9 |
|---|---|---|---|
| Moisture % | 9.0 | 10.5 | 9.4 |
| protein % | 25.7 | 23.4 | 27.7 |
| Fat % (Acid Hydrolysis) | 10.8 | 9.6 | 12.1 |
| Calcium % | 1.4 | 1.04 | 1.53 |
| Phosphorus % | .92 | .70 | 1.10 |
| Lysine (%) | 1.24 | 1.05 | — |
| Methionine (%) | .41 | .42 | — |
| Sodium (%) | .45 | .32 | .48 |
| Potassium (%) | .77 | .52 | .94 |
| Chloride (%) | .68 | .67 | .64 |
| Na + K—Cl (Meq/100 g)* | 21 | 8 | 27 |

*Dietary Electrolyte Balance

TABLE 8

Effect Of The Diets On Hip Joint laxity

|  | Diet 7 | Diet 8 | Diet 9 | Statistical Significance |
|---|---|---|---|---|
| Number of Pups | 11 | 11 | 11 | |
| Weight Gain* (lb) | 90.4 | 90.6 | 87.9 | |
| Norberg Score (Avg) | | | | |
| Left Hip | 77.3 | 79.6 | 76.6 | N.S. |
| Right Hip | 79.6 | 82.3 | 78.1 | P < .10 |
| Average | 78.5 | 81.0 | 77.3 | P < .15 |
| Worst Hip | 76.6 | 79.3 | 74.9 | P < .15 |

*Average weight gain on a 50/50 sex basis

An examination of the Norberg scores indicates that the diet having the lower levels of dietary electrolyte balance had the best Norberg scores thereby indicating that controlling the dietary electrolyte balance clearly reduced the severity of hip joint laxity.

It is intended to include within the scope of the present invention all reasonable equivalents and or modifications thereto.

What is claimed is:

1. A method of reducing the severity of hip joint laxity in dogs comprising:
    (a) forming a nutritionally balanced dog food composition having a dietary electrolyte balance of about 7-20 meq/100 g wherein the dietary electrolyte balance is determined according to the following formula:

Dietary Electrolyte Balance (Meq/100 g) =

$$\frac{Sodium}{(Meq/100\ g)} + \frac{Potassium}{(Meq/100\ g)} - \frac{Chloride}{(Meq/100\ g)}$$

and
    (b) feeding said composition to dogs.

2. The method of claim 1 wherein the dietary electrolyte balance is about 10 Meq/100 g.

3. The method of claim 1 wherein the dog food composition has a protein content of at least about 15% by weight.

4. The method of claim 1 wherein the dog food composition has a protein content of at least about 20% by weight.

* * * * *